United States Patent
Shirooka et al.

(10) Patent No.: US 10,358,166 B2
(45) Date of Patent: Jul. 23, 2019

(54) VEHICLE FRONT SECTION STRUCTURE

(71) Applicant: TOYOTA JIDOSHA KABUSHIKI KAISHA, Toyota-shi, Aichi-ken (JP)

(72) Inventors: Masakazu Shirooka, Toyota (JP); Kengo Kishimoto, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 15/821,305

(22) Filed: Nov. 22, 2017

(65) Prior Publication Data

US 2018/0148098 A1    May 31, 2018

(30) Foreign Application Priority Data

Nov. 29, 2016    (JP) ................................. 2016-231613

(51) Int. Cl.
| | |
|---|---|
| *B62D 25/14* | (2006.01) |
| *B62D 21/15* | (2006.01) |
| *B62D 25/08* | (2006.01) |
| *B60R 21/203* | (2006.01) |

(52) U.S. Cl.
CPC ......... *B62D 21/152* (2013.01); *B62D 25/088* (2013.01); *B62D 25/145* (2013.01); *B60R 21/203* (2013.01)

(58) Field of Classification Search
CPC .. B62D 25/088; B62D 25/145; B62D 21/152; B60R 21/203
USPC ................................................ 280/777, 779
See application file for complete search history.

(56) References Cited

U.S. PATENT DOCUMENTS

| | | | |
|---|---|---|---|
| 7,686,334 B2* | 3/2010 | Schaupensteiner ... | B60R 21/045 180/90 |
| 8,141,903 B2* | 3/2012 | Atsumi ................ | B62D 25/145 180/78 |
| 8,950,778 B2* | 2/2015 | Fukushima .......... | B62D 25/145 280/779 |
| 9,446,800 B2* | 9/2016 | Davos .................. | B62D 29/001 |
| 10,220,883 B2* | 3/2019 | Nishimura ........... | B62D 25/145 |

(Continued)

FOREIGN PATENT DOCUMENTS

| | | |
|---|---|---|
| JP | S64-025968 U | 2/1989 |
| JP | H10-236336 A | 9/1998 |

(Continued)

*Primary Examiner* — Toan C To
(74) *Attorney, Agent, or Firm* — Oliff PLC

(57) ABSTRACT

A vehicle front section structure includes: a suspension tower to which an upper end portion of a strut of a suspension is attached; a dash panel that demarcates an engine compartment from a cabin; an instrument panel reinforcement that bridges a right and left pair of front pillars; an intervening member that is disposed between the suspension tower and the dash panel; a connecting portion that is disposed on the instrument panel reinforcement and that is configured to be connected with a steering support member for supporting, via a steering column, a steering wheel in which an airbag is stored; a brace that couples the dash panel and the steering support member to each other; and a weak portion that is formed in the instrument panel reinforcement on the vehicle front side thereof and at a vicinity of a vehicle width direction inner side of the connecting portion.

4 Claims, 4 Drawing Sheets

(56) References Cited

U.S. PATENT DOCUMENTS

| | | | | |
|---|---|---|---|---|
| 2004/0135400 A1* | 7/2004 | Matsuzaki | ........ | B29C 45/14598 296/193.02 |
| 2013/0241235 A1* | 9/2013 | Baudart | ............... | B62D 25/147 296/193.02 |
| 2014/0319812 A1 | 10/2014 | Fukushima et al. | | |
| 2015/0145237 A1* | 5/2015 | Morita | ................. | B62D 25/145 280/779 |
| 2016/0059900 A1* | 3/2016 | Eshima | ................ | B62D 25/145 296/187.09 |

FOREIGN PATENT DOCUMENTS

| | | |
|---|---|---|
| JP | 2001-130445 A | 5/2001 |
| JP | 2002-284018 A | 10/2002 |
| JP | 2014-223893 A | 12/2014 |
| JP | 2014-227154 A | 12/2014 |
| JP | 5708829 B2 | 4/2015 |
| JP | 2016-037084 A | 3/2016 |
| WO | 2013/108304 A1 | 7/2013 |

* cited by examiner

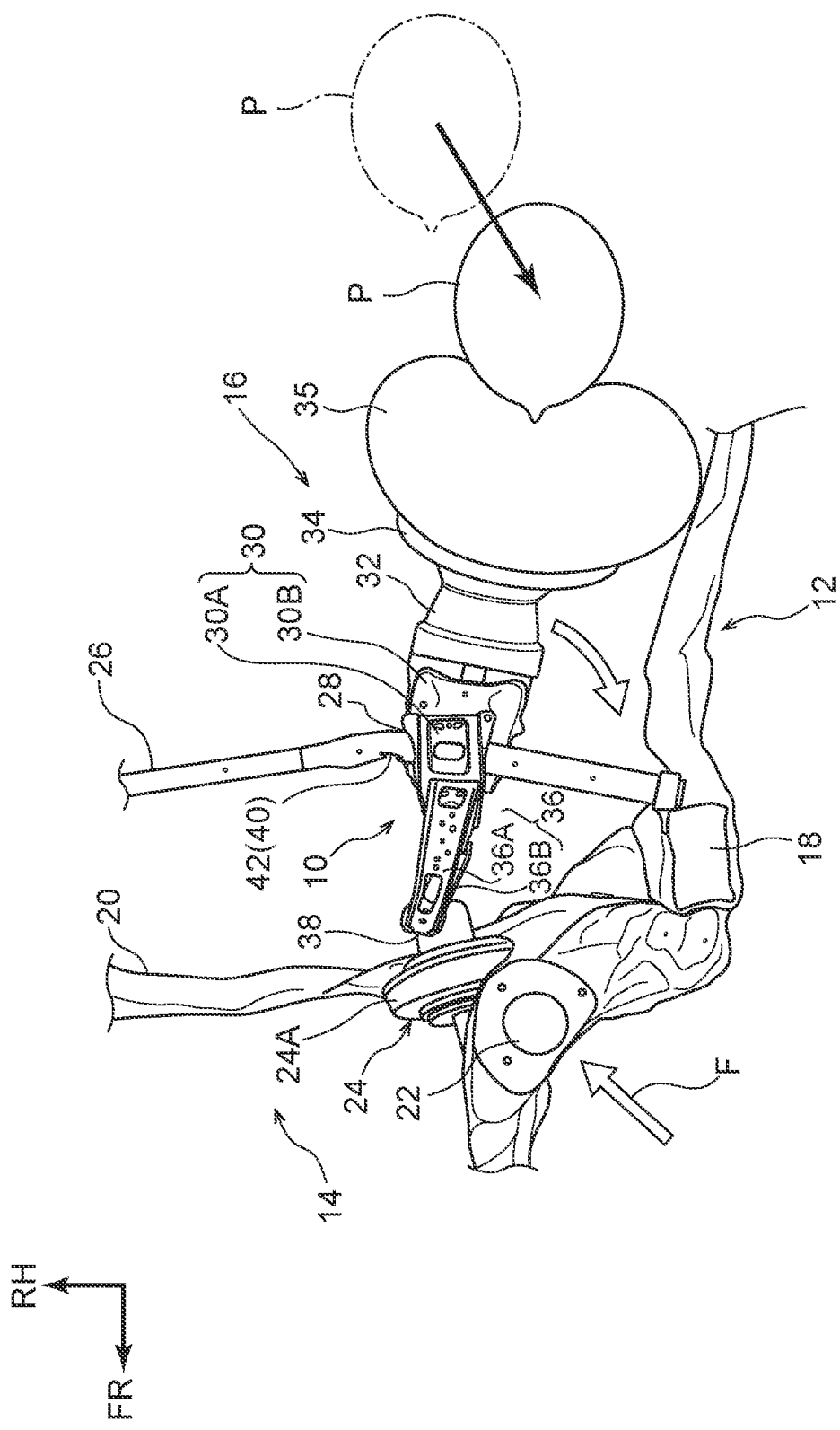

VEHICLE FRONT SECTION STRUCTURE

CROSS-REFERENCE TO RELATED APPLICATION

This application is based on and claims priority under 35 USC 119 from Japanese Patent Application No. 2016-231613 filed on Nov. 29, 2016, the disclosure of which is incorporated by reference herein.

BACKGROUND

Technical Field

The present disclosure relates to a vehicle front section structure.

Related Art

Conventionally, a structure has been known in which a weak portion is provided in the outer peripheral surface of an instrument panel reinforcement, at the vehicle rear side thereof between a steering support member and a driver's seat-side front pillar (e.g., see Japanese Patent No. 5,708,829).

In this structure, at the time of a small overlap crash in which a crash load is input from the vehicle front side to the part of the vehicle front section positioned further outward in the vehicle width direction than a driver's seat-side front side member as seen in a plan view, when the driver's seat-side front pillar moves backward, the part of the instrument panel reinforcement positioned further outward in the vehicle width direction than the weak portion bends in the vehicle rearward direction at the weak portion.

For that reason, at the time of the small overlap crash described above, a steering wheel provided on a rear end portion of a steering shaft supported via the steering support member and a steering column (column tube) on the part of the instrument panel reinforcement positioned further inward in the vehicle width direction than the weak portion is kept from tilting inward in the vehicle width direction, and an airbag stored in the steering wheel is kept from changing the deployment direction toward inward in the vehicle width direction.

However, at the time of the small overlap crash described above or an oblique crash in which a crash load is input from the vehicle oblique front side to the vehicle front section at the driver's seat side as seen in a plan view, the vehicle is displaced in a lateral direction, and the occupant moves forward and outward in the vehicle width direction because of inertial force at that time. Therefore, there is the concern that the deployment direction of the airbag and the occupant will be out of alignment in the vehicle width direction if just vehicle width direction inward deployment of the airbag is restrained.

SUMMARY

The present disclosure provides a vehicle front section structure that may direct the deployment direction of an airbag outward in the vehicle width direction at the time of a small overlap crash or an oblique crash.

One aspect of the present disclosure is a vehicle front section structure including: a suspension tower that is configured to be attached with an upper end portion of a strut of a suspension; a dash panel that is configured to demarcate an engine compartment from a cabin; an instrument panel reinforcement that is configured to bridge a right and left pair of front pillars; an intervening member that is disposed between the suspension tower and the dash panel; a connecting portion that is disposed on the instrument panel reinforcement and that is configured to be connected with a steering support member for supporting, via a steering column, a steering wheel in which an airbag is stored; a brace that is configured to couple the dash panel and the steering support member to each other; and a weak portion that is formed in the instrument panel reinforcement on the vehicle front side thereof and at a vicinity of a vehicle width direction inner side of the connecting portion.

According to this aspect, the weak portion is formed in the instrument panel reinforcement on the vehicle front side thereof and at a vicinity of the vehicle width direction inner side of the connecting portion to which the steering support member, is connected, and the support member supports, via the steering column, the steering wheel in which the airbag is stored.

Consequently, at the time of a small overlap crash or an oblique crash, the instrument panel reinforcement is bent so as to project out in the vehicle rearward direction as seen in a plan view at the weak portion. Because of this, the steering wheel is tilted so as to face outward in the vehicle width direction and the deployment direction of the airbag is tilted so as to face outward in the vehicle width direction. It should be noted that "vicinity of the vehicle width direction inner side of the connecting portion" means a range in which the vehicle width direction outer end portion of the weak portion comes up to the connecting portion as seen in a plan view.

In this way, according to this aspect, the deployment direction of the airbag may be directed outward in the vehicle width direction at the time of a small overlap crash or an oblique crash.

In the above aspect, the weak portion may be a hole portion or a recess portion.

According to this configuration, the weak portion is configured by a hole portion or a recess portion. Consequently, it is easier to form the weak portion compared to a case in which the weak portion is not configured by a hole portion or a recess portion.

BRIEF DESCRIPTION OF THE DRAWINGS

An exemplary embodiment of the present disclosure will be described in detail based on the following figures, wherein:

FIG. 4 is a plan view illustrating a state of the vehicle front section structure pertaining to the embodiment after an oblique crash.

DETAILED DESCRIPTION

Figure 1:
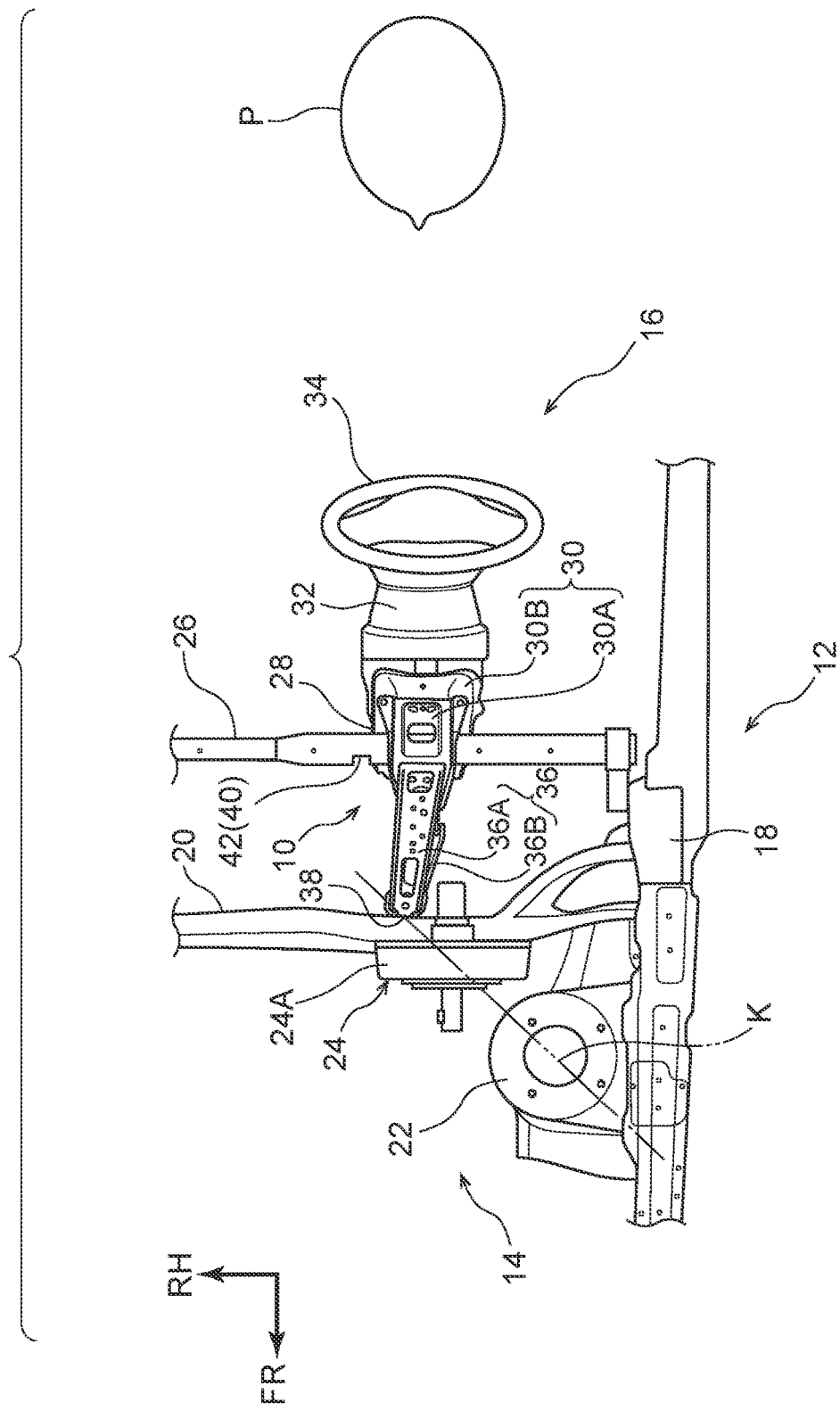
FIG. 1 is a plan view illustrating a vehicle front section structure pertaining to the embodiment.

An embodiment pertaining to the present disclosure will be described in detail below based on the drawings. It should be noted that for convenience of description arrow UP illustrated in the drawings indicates a vehicle upward direction, arrow FR indicates a vehicle forward direction, and arrow RH indicates a vehicle rightward direction. Furthermore, when the directions of upper/lower, front/rear, and right/left are used without further specification in the following description, these will be understood to mean upper/lower in the vehicle vertical direction, front/rear in the vehicle front-rear direction, and right/left in the vehicle right and left direction (vehicle width direction). Furthermore, in the present embodiment, a vehicle in which the driver's seat is on the left side is taken as example.

Figure 2:
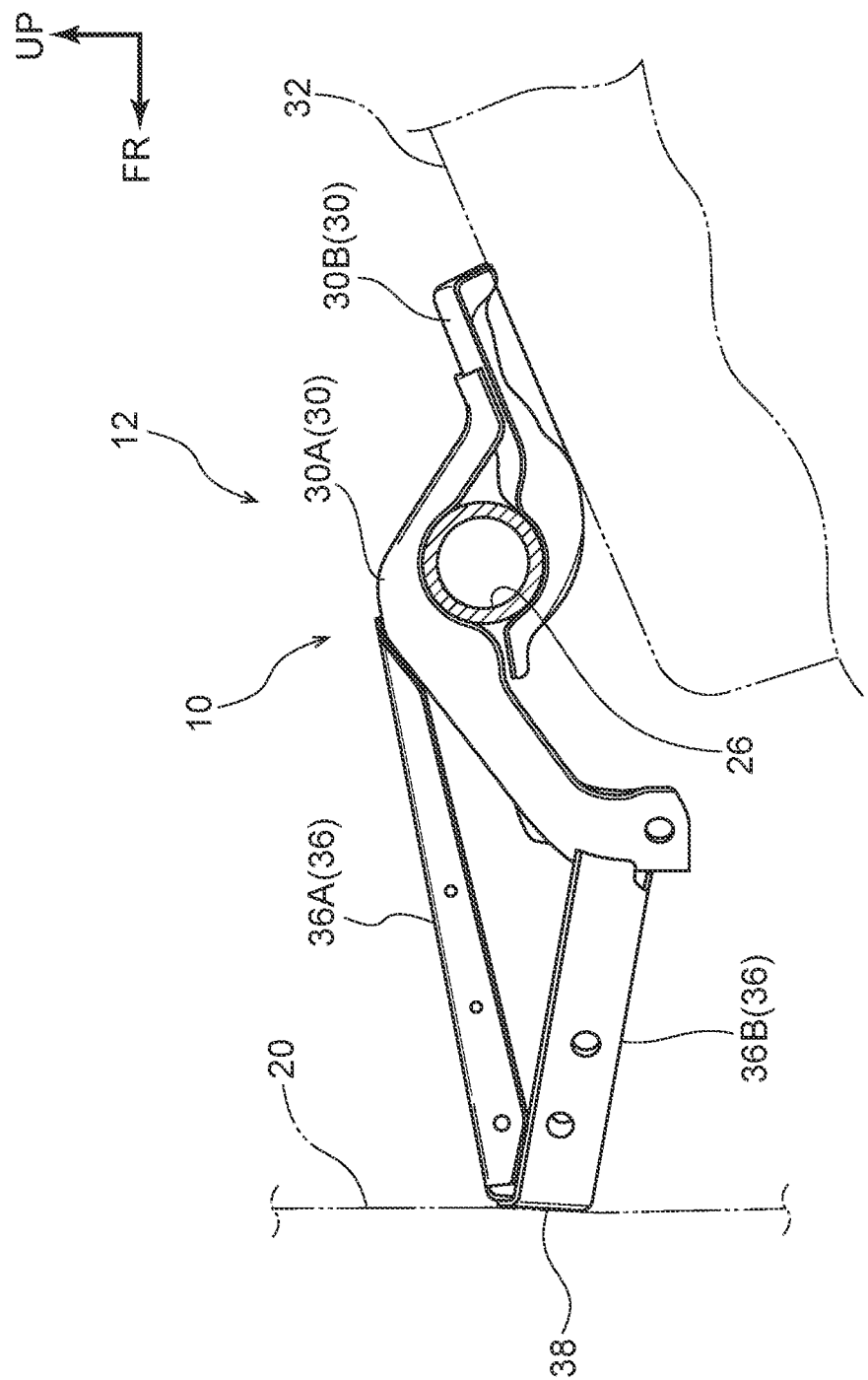
FIG. 2 is a side view illustrating the vehicle front section structure pertaining to the embodiment.

As illustrated in FIG. 1 and FIG. 2, a vehicle 12 equipped with a vehicle front section structure 10 pertaining to the present embodiment is equipped with a flat plate-shaped dash panel 20 that demarcates an engine compartment 14 from a cabin 16. Substantially open cylinder-shaped suspension towers 22, to which upper end portions of struts (not illustrated in the drawings) of strut suspensions are attached, are provided as a right and left pair inside the engine compartment 14 at both vehicle width direction sides further in the vehicle forward direction than the dash panel 20.

Additionally, as seen in the plan view illustrated in FIG. 1, a brake booster 24 serving as an intervening member is provided between the suspension tower 22 and the dash panel 20. The brake booster 24 has a substantially disc-shaped main body 24A and is configured such that a push rod (not illustrated in the drawings) coupled to a brake pedal (not illustrated in the drawings) is connected to the axial center portion of the main body 24A.

Furthermore, an open cylinder-shaped (pipe-shaped) instrument panel reinforcement 26 bridges front pillars 18 provided as a right and left pair. Additionally, an upper steering support 30A and a lower steering support 30B serving as a steering support member 30 are supported on the instrument panel reinforcement 26.

Specifically, the upper steering support 30A is formed in substantially a hat shaped cross section and extends in the vehicle front-rear direction, and the lower surfaces of both vehicle width direction end portions of the midway portion of the upper steering support 30A are joined by arc welding to the upper portion of the outer peripheral surface of the instrument panel reinforcement 26. The section of the upper steering support 30A positioned further in the vehicle forward direction than the midway portion of the upper steering support 30A slopes obliquely forward and downward as seen in a side view seen from the vehicle width direction.

The lower steering support 30B is formed in substantially a hat shaped cross section, and the upper surfaces of both vehicle width direction end portions of the front end portion of the lower steering support 30B are joined by arc welding to the lower portion of the outer peripheral surface of the instrument panel reinforcement 26. The rear end portion of the upper steering support 30A is joined as a result of being fastened by bolts, for example, to the vehicle front-rear direction midway portion of the lower steering support 30B.

A steering column 32 having a column tube (not illustrated in the drawings) is attached to the lower surface of the lower steering support 30B. The steering column 32 is configured to axially support a steering shaft (not illustrated in the drawings) via bearings provided inside the column tube, and a steering wheel 34 in which an airbag 25 (see FIG. 4) is stored is integrally attached to the rear end portion of the steering shaft.

The arc-welded portion of the vehicle width direction inner section of the lower steering support 30B is a connecting portion 28 of the instrument panel reinforcement 26 to which the steering support member 30 is connected.

Furthermore, the midway portion and the front end portion of the upper steering support 30A are coupled to the dash panel 20 by a brace 36 extending in the vehicle front-rear direction.

Specifically, the brace 36 is configured by two members, an upper brace 36A formed in substantially a hat shaped cross section and a lower brace 36B formed in substantially an inverted hat shaped cross section. The rear end portion of the upper brace 36A is joined by arc welding to the midway portion of the upper steering support 30A, and the rear end portion of the lower brace 36A is joined by arc welding to the front end portion of the upper steering support 30A.

Additionally, the front end portion of the upper brace 36A is joined by arc welding to the front end portion of the lower brace 36B, and the front end portion of the lower brace 36B is fastened to the rear surface of the dash panel 20. That is, a bracket (not illustrated in the drawings) is provided on the rear surface of the dash panel 20, and the front end portion of the lower brace 36B is joined as a result of being fastened by bolts to the bracket.

Because of the configuration described above, the position of the brace 36 in the vehicle width direction and the position of the steering support member 30 in the vehicle width direction substantially coincide with each other. In other words, the brace 36 and the steering support member 30 are substantially disposed on an imaginary straight line (not illustrated in the drawings) lying along the vehicle front-rear direction.

The brace 36 is configured such that its bend strength is greater than the bend strength of the instrument panel reinforcement 26. "Bend strength" here is the maximum value of bending stress (resistance with respect to a bending moment) produced inside the brace 36 and inside the instrument panel reinforcement 26 by the input of a crash load, for example, and is given by bending stress × section modulus.

Furthermore, the front end portion of the brace 36, specifically the front end portion of the lower brace 36B, fastened to the dash panel 20 serves as a fastened portion 38, and as seen in a plan view the substantially central section of the suspension tower 22, the substantially central section of the brake booster 24, and the fastened portion 38 are lined up on an imaginary straight line K (see FIG. 1) whose vehicle front side slopes obliquely outward in the vehicle width direction with respect to the vehicle front-rear direction.

A driver's seat airbag 35 (see FIG. 4) is folded up and stored in the radial direction inner section (central portion) of the steering wheel 34. Consequently, when the vehicle 12 has been involved in a frontal crash, gas is supplied from an inflator (not illustrated in the drawings) so that the airbag 35 instantaneously inflates and deploys in a flat substantially spherical shape.

Figure 3A:
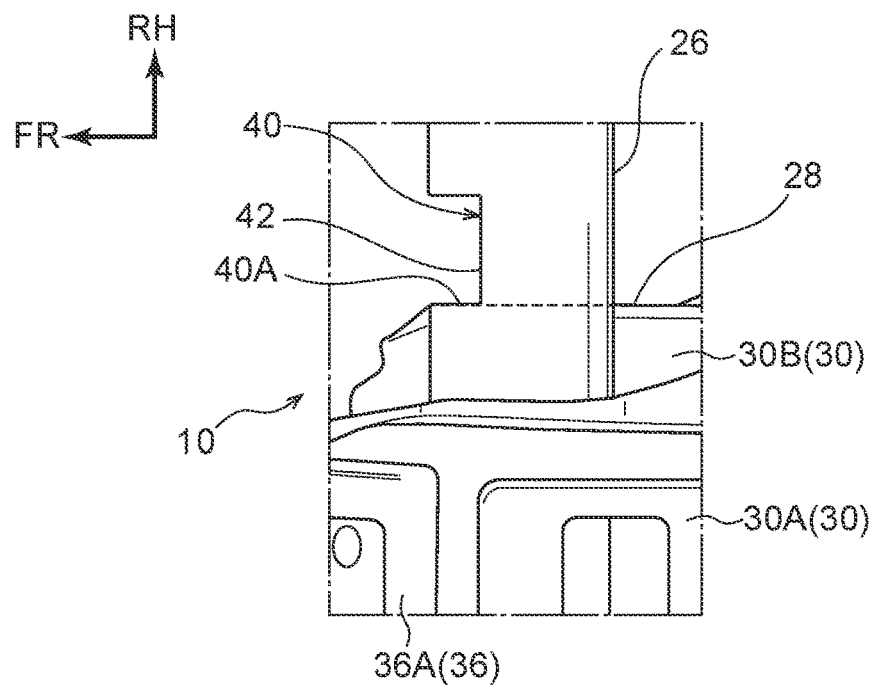
FIG. 3A is an enlarged plan view illustrating a weak portion of an instrument panel reinforcement configuring the vehicle front section structure pertaining to the embodiment.
Figure 3B:
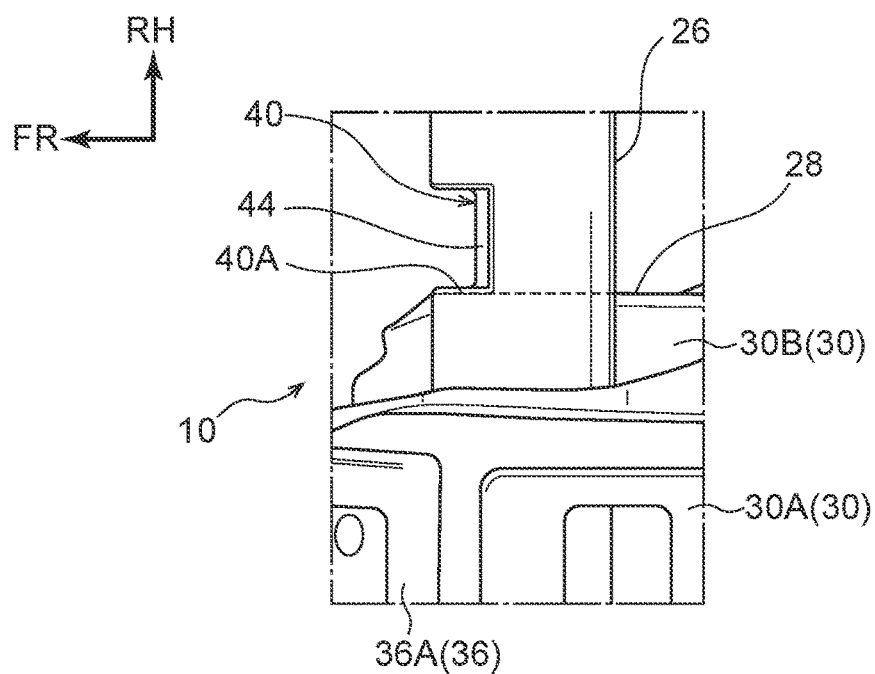
FIG. 3B is an enlarged plan view illustrating an example modification of the weak portion of the instrument panel reinforcement configuring the vehicle front section structure pertaining to the embodiment.

As illustrated in FIG. 1, FIG. 3A, and FIG. 3B, the instrument panel reinforcement 26 has a weak portion 40 formed in its outer peripheral surface on the vehicle front side thereof and at a vicinity of the vehicle width direction inner side of the connecting portion 28. It should be noted that here "vicinity of the vehicle width direction inner side of the connecting portion 28" means a range in which a vehicle width direction outer end portion 40A (see FIG. 3A and FIG. 3B) of the weak portion 40 comes up to the connecting portion 28 as seen in a plan view. In other words, it means a range in which the vehicle width direction outer end portion 40A of the weak portion 40 and the connecting portion 28 are disposed in substantially the same position in the vehicle width direction. More specifically, it is preferred that the vehicle width direction outer end portion 40A of the weak portion 40 be disposed in a range of about 50 mm, for example, inward in the vehicle width direction from the connecting portion 28.

As the weak portion 40, a rectangular hole portion 42 illustrated in FIG. 1, FIG. 3A, and FIG. 4, a rectangular recess portion 44 illustrated in FIG. 3B, or a rectangular thin-walled portion not illustrated in the drawings is preferably selected. However, the weak portion 40 is not particularly limited to these. Furthermore, the hole portion 42 and the recess portion 44 are not particularly limited to the rectangular shapes as illustrated in the drawings and may also have circular shapes, for example.

Next, the action of the vehicle front section structure 10 pertaining to the present embodiment equipped with the weak portion 40 described above (as an example, the hole portion 42) will be described.

As illustrated in FIG. 4, when the driver's seat side of the vehicle 12 has been involved in an offset frontal crash such as an oblique crash for example, a front side member (not illustrated in the drawings) on the driver's seat side undergoes bending deformation inward in the vehicle width direction, and a crash load F is input to the suspension tower 22 from the vehicle oblique front side to the vehicle oblique rear side. When this happens, the suspension tower 22 moves rearward and inward in the vehicle width direction while undergoing plastic deformation.

That is, the suspension tower 22 moves backward along the imaginary straight line K (see FIG. 1). Then, the brake booster 24 and the dash panel 20 (i.e., the fastened portion 38) are pushed rearward and inward in the vehicle width direction by the suspension tower 22, and the brake booster 24 and the dash panel 20 (i.e., the fastened portion 38) move backward along the imaginary straight line K.

Thus, when the vehicle 12 has been involved in an oblique crash, the crash load F is transmitted via the suspension tower 22, the brake booster 24, and the dash panel 20 (i.e., the fastened portion 38) from the vehicle oblique front side to the front end portion of the brace 36 (the upper brace 36A and the lower brace 36B).

Here, the brace 36 is configured such that its bend strength is greater than the bend strength of the instrument panel reinforcement 26. Consequently, even when the crash load F is input from the vehicle oblique front side to the front end portion of the brace 36, the brace 36 does not easily undergo bending deformation and struts between the dash panel 20 and the instrument panel reinforcement 26.

In other words, the crash load F input to the front end portion of the brace 36 is effectively transmitted from the brace 36 via the upper steering support 30A to the instrument panel reinforcement 26. Because of this, the instrument panel reinforcement 26 is bent so as to project out in the vehicle rearward direction as seen in a plan view at the hole portion 42 serving as an example of the weak portion 40.

When this happens, the lower steering support 30B tilts (turns in the clockwise direction in FIG. 4 about an axis coinciding with the vehicle vertical direction) so as to face outward in the vehicle width direction as seen in a plan view, because the connecting portion 28 of the lower steering support 30B configuring the steering support member 30 is disposed in the instrument panel reinforcement 26 in a position further outward (leftward) in the vehicle width direction than the hole portion 42 and, therefore, the steering wheel 34 tilts so as to face outward (leftward) in the vehicle width direction via the steering column 32.

In the steering wheel 34, the airbag 35 inflates and deploys at the point in time when the vehicle 12 became involved in the oblique crash. Consequently, because the steering wheel 34 tilts so as to face outward in the vehicle width direction, the airbag 35 also tilts so as to face outward (leftward) in the vehicle width direction. Furthermore, when the vehicle 12 is involved in the oblique crash and is displaced in a lateral direction, an occupant P moves forward and outward (leftward) in the vehicle width direction because of inertial force at that time.

Thus, the contact area between the airbag 35 that has tilted so as to face outward (leftward) in the vehicle width direction and the head of the occupant P who has moved forward and outward (leftward) in the vehicle width direction may be increased, and the force with which the airbag 35 restrains the head of the occupant P may be enhanced. That is, according to the vehicle front section structure 10 pertaining to the present embodiment, at the time of an offset frontal crash (oblique crash) of the vehicle 12, the injury value sustained by the head of the occupant P may be reduced and the head of the occupant P may be effectively protected.

Furthermore, when the contact area between the airbag 35 and the head of the occupant P may be increased in this way, it is unnecessary to increase the size of the airbag 35 in order to increase the contact area between the airbag 35 and the head of the occupant P. Consequently, in correspondence thereto, it is possible to reduce the size of the airbag 35 and it is possible to reduce the manufacturing cost of the airbag 35.

Furthermore, when the weak portion 40 is configured by the hole portion 42 or the recess portion 44, there is the advantage that it is easier to form the weak portion 40 compared to a case in which the weak portion 40 is not configured by the hole portion 42 or the recess portion 44. It should be noted that the oblique crash in the present embodiment is a crash from a vehicle oblique front side at a relative velocity of 90 km/hour defined by the National Highway Traffic Safety Administration (NHTSA) for example (as an example, a crash in which the relative angle with the crash partner is 15° and the amount of overlap in the vehicle width direction is about 35%).

The vehicle front section structure 10 pertaining to the embodiment has been described above based on the drawings, but the embodiment is not limited to what is illustrated in the drawings and may undergo appropriate design changes to the extent that they do not depart from the spirit of the present disclosure. For example, the instrument panel reinforcement 26 may be formed in a square tube shape.

Furthermore, the intervening member is not limited to the brake booster 24 and may also be another member as long as it is a rigid member provided inside the engine compartment 14. Furthermore, in the embodiment, an example in which the vehicle 12 has been involved in an oblique crash is described, but the same holds true even when the vehicle 12 has been involved in a small overlap crash.

The small overlap crash in the present embodiment is a crash at a relative velocity of 64 km/hour defined by the Insurance Institute for Highway Safety (IIHS) for example and in which the amount of overlap in the vehicle width direction with the crash partner is 25% or less, and is a crash with respect to a section further outward in the vehicle width direction than a front side member that is a vehicle frame member as seen in a plan view.

What is claimed is:
1. A vehicle front section structure comprising:
  a suspension tower that is configured to be attached with an upper end portion of a strut of a suspension;
  a dash panel that is configured to demarcate an engine compartment from a cabin;

an instrument panel reinforcement that is configured to bridge a right and left pair of front pillars;

an intervening member that is disposed between the suspension tower and the dash panel;

a connecting portion that is disposed on the instrument panel reinforcement and that is configured to be connected with a steering support member for supporting, via a steering column, a steering wheel in which an airbag is stored;

a brace that is configured to couple the dash panel and the steering support member to each other; and a weak portion that is formed in the instrument panel reinforcement on the vehicle front side thereof and at a vicinity of a vehicle width direction inner side of the connecting portion.

2. The vehicle front section structure according to claim 1, wherein the weak portion comprises a hole portion or a recess portion.

3. The vehicle front section structure according to claim 1, wherein a vehicle width direction outer end portion of the weak portion and the connecting portion are disposed in substantially the same position in the vehicle width direction.

4. The vehicle front section structure according to claim 1, wherein the intervening member comprises a brake booster.

* * * * *